US010084165B2

United States Patent
Fukushima et al.

(10) Patent No.: US 10,084,165 B2
(45) Date of Patent: Sep. 25, 2018

(54) DETACHABLE STRUCTURE OF BATTERY TO BE ATTACHED TO CASE, AND ELECTRONIC DEVICE

(71) Applicant: CASIO COMPUTER CO., LTD., Shibuya-ku, Tokyo (JP)

(72) Inventors: Shingo Fukushima, Ome (JP); Takahiro Moriya, Kokubunji (JP)

(73) Assignee: CASIO COMPUTER CO., LTD., Tokyo (JP)

(*) Notice: Subject to any disclaimer, the term of this patent is extended or adjusted under 35 U.S.C. 154(b) by 0 days.

(21) Appl. No.: 15/819,701

(22) Filed: Nov. 21, 2017

(65) Prior Publication Data

US 2018/0159097 A1  Jun. 7, 2018

(30) Foreign Application Priority Data

Dec. 6, 2016 (JP) ................................. 2016-236370
Sep. 4, 2017 (JP) ................................. 2017-169273

(51) Int. Cl.
| | | |
|---|---|---|
| *G03B 17/02* | (2006.01) | |
| *H04N 5/225* | (2006.01) | |
| *H01M 2/10* | (2006.01) | |
| *H01M 10/0525* | (2010.01) | |

(52) U.S. Cl.
CPC .......... *H01M 2/1066* (2013.01); *G03B 17/02* (2013.01); *H01M 2/1094* (2013.01); *H01M 10/0525* (2013.01); *H04N 5/2252* (2013.01); *H01M 2220/30* (2013.01)

(58) Field of Classification Search
None
See application file for complete search history.

(56) References Cited

U.S. PATENT DOCUMENTS

| | | | | |
|---|---|---|---|---|
| 9,023,511 B1 * | 5/2015 | Chamberlain | ...... | H01M 2/1066 |
| | | | | 429/163 |
| 9,508,965 B1 * | 11/2016 | Zhang | .................... | G03B 17/02 |
| 9,680,187 B2 * | 6/2017 | Stephens | ............. | H01M 10/425 |
| 2002/0118333 A1 * | 8/2002 | Koiwa | .............. | G02F 1/133308 |
| | | | | 349/161 |
| 2014/0355207 A1 * | 12/2014 | Stephens | ............. | H01M 10/425 |
| | | | | 361/679.55 |
| 2014/0377595 A1 * | 12/2014 | Baba | ........................ | G08B 6/00 |
| | | | | 429/8 |
| 2015/0228944 A1 * | 8/2015 | Lin | ..................... | H01M 2/1066 |
| | | | | 429/100 |

FOREIGN PATENT DOCUMENTS

| | | | |
|---|---|---|---|
| JP | 2014116748 A | 6/2014 | |
| JP | 2014116749 A | 6/2014 | |
| JP | 2015088449 A | 5/2015 | |
| JP | 2016103738 A | 6/2016 | |

* cited by examiner

*Primary Examiner* — W B Perkey
(74) *Attorney, Agent, or Firm* — Holtz, Holtz & Volek PC

(57) ABSTRACT

A detachable structure of a battery to be attached to a case includes a wrapping of the battery and a housing of the case. The wrapping wraps the battery and comprises a slit. The housing houses the battery wrapped in the wrapping. The housing is bonded to the wrapping in a part of area.

18 Claims, 11 Drawing Sheets

FIG. 7
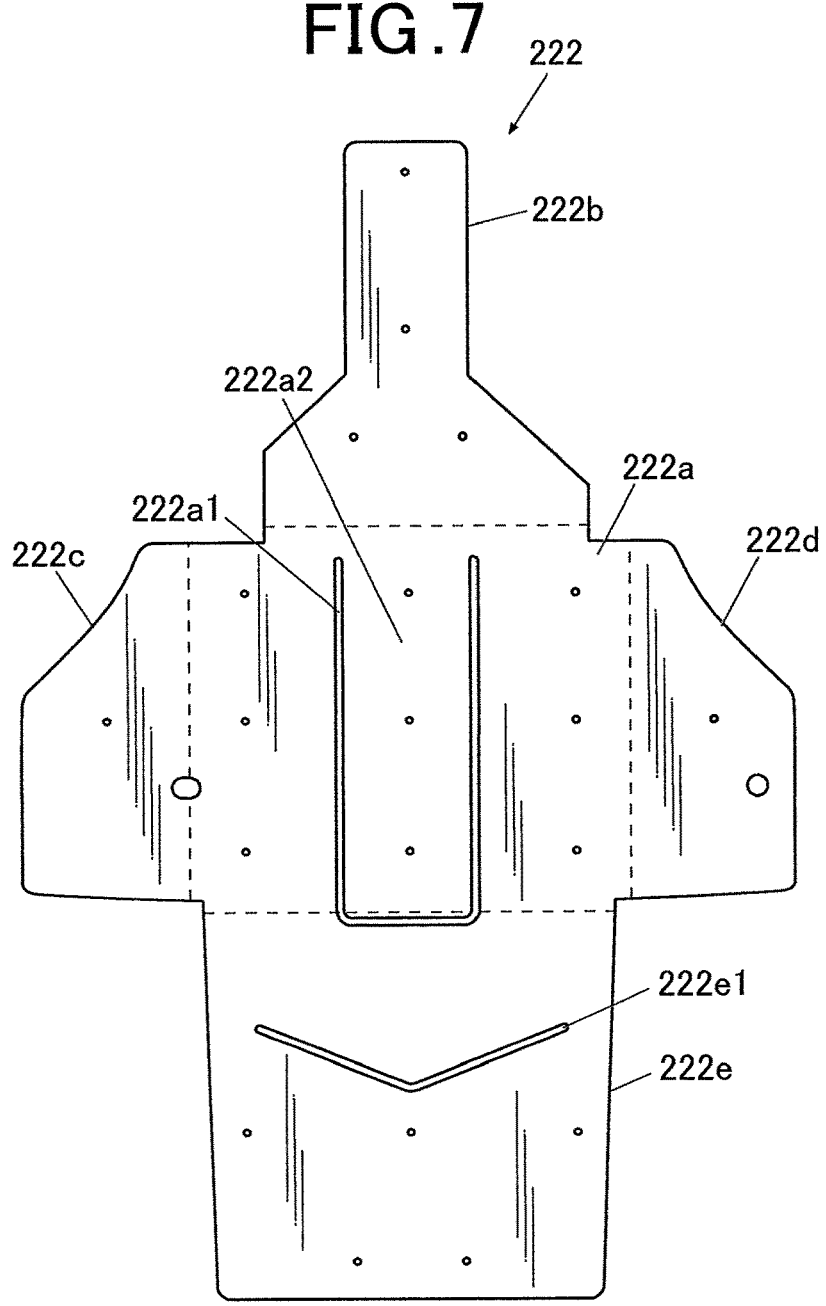
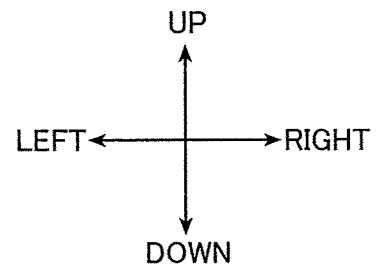

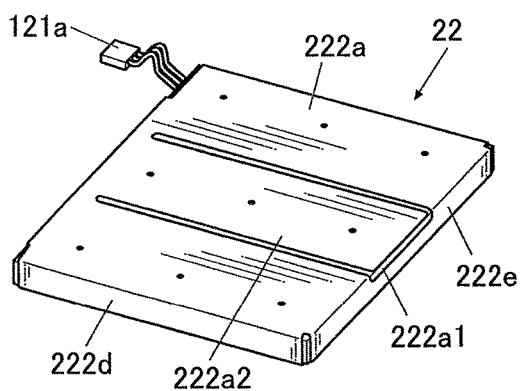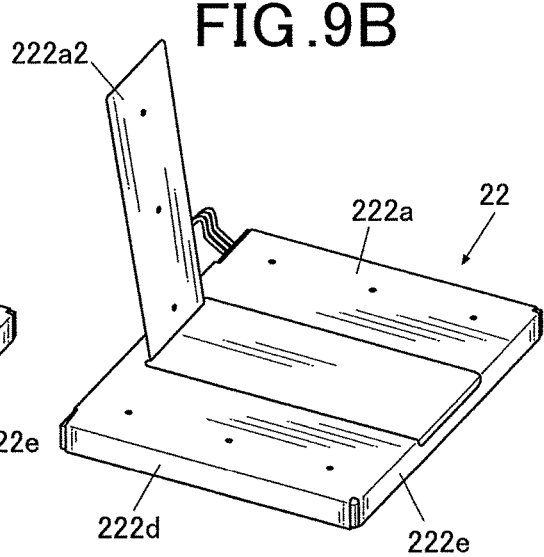

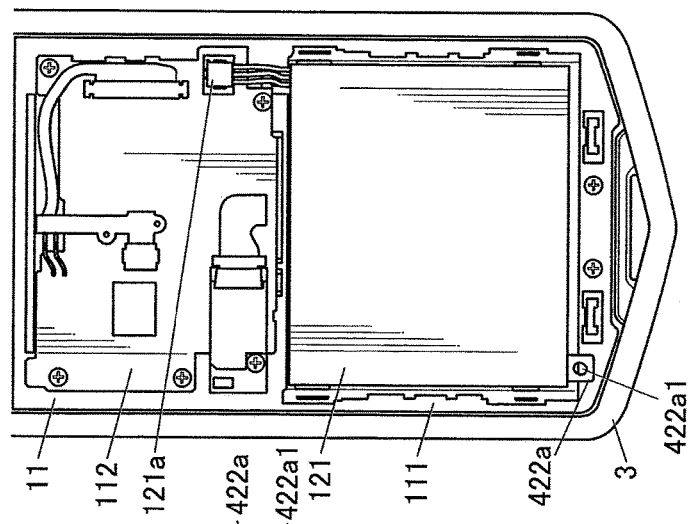
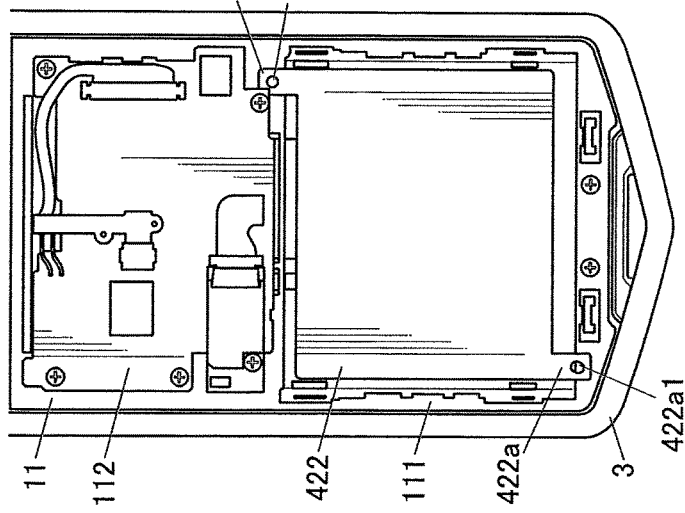
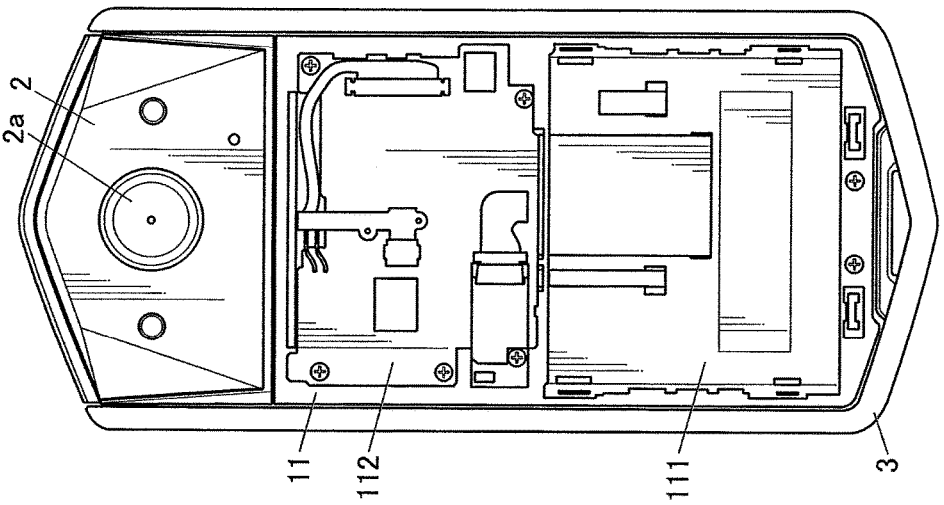

DETACHABLE STRUCTURE OF BATTERY TO BE ATTACHED TO CASE, AND ELECTRONIC DEVICE

CROSS-REFERENCE TO RELATED APPLICATIONS

This application is based upon and claims the benefit of priority from the prior Japanese Patent Application No. 2016-236370 filed on Dec. 6, 2016 and No. 2017-169273 filed on Sep. 4, 2017, the entire contents of which are incorporated herein by reference.

BACKGROUND OF THE INVENTION

1. Field of the Invention

The present invention relates to a detachable structure of a battery to be attached to a case, and an electronic device.

2. Description of the Related Art

For portable terminals equipped with a non-rigid battery pack, a technique that makes the battery pack detachable and reusable without causing a damage has been proposed in JP 2015-88449A, in which a battery pack is wrapped in a wrapping that is bonded to a battery housing.

SUMMARY OF THE INVENTION

To achieve at least one of the abovementioned objects, according to a first aspect of the present invention, there is provided a detachable structure of a battery to be attached to a case, including:

a wrapping which wraps the battery and which comprises a slit; and a housing of the case which houses the battery wrapped in the wrapping;

wherein the housing is bonded to the wrapping in a part of area.

According to a second aspect of the present invention, there is provided a detachable structure of a battery to be attached to a case, including:

a plate frame to which the battery is bonded; and a housing of the case which houses the battery bonded to the frame, wherein the frame is rigid and comprises a picking portion at least on a part of a side of the frame, and wherein the housing comprises a fitting portion in which the picking portion is fitted when the battery bonded to the frame is housed.

According to a third aspect of the present invention, there is provided a detachable structure of a battery to be attached to a case, including:

a wrapping which wraps the battery and which has a predetermined thickness; and a housing of the case which houses the battery wrapped in the wrapping, wherein the housing is bonded to the wrapping in a part of area, and wherein, when the battery is replaced, the wrapping is teared so that the battery is removed from the wrapping since the wrapping is bonded to the housing in the part of the area.

According to a fourth aspect of the present invention, there is provided an electronic device including the detachable structure of the battery to be attached to the case.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 7 illustrates an expanded view of a protection sheet according to a variation.

FIG. 9A is a perspective view of the battery assembly before a picking portion is pulled up.

FIG. 9B is a perspective view of the battery assembly after the picking portion is pulled up.

FIG. 13A is a plan view of a housing in which a battery assembly is not housed.

FIG. 13B is a plan view of the housing in which the battery assembly is housed (although the battery is not shown in the figure).

FIG. 13C is a plan view of the housing in which the battery assembly is housed.

DETAILED DESCRIPTION OF THE INVENTION

Hereinafter, one or more embodiments of the present invention will be described with reference to the drawings. However, the scope of the invention is not limited to the disclosed embodiments.

First Embodiment

Figure 1A:
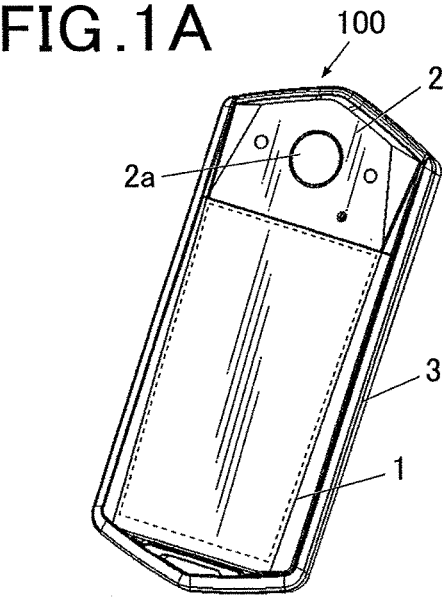
FIG. 1A is a perspective view of a camera, which is a first embodiment of an electronic device according to a present invention, illustrating the camera in a normal photography mode.
Figure 1B:
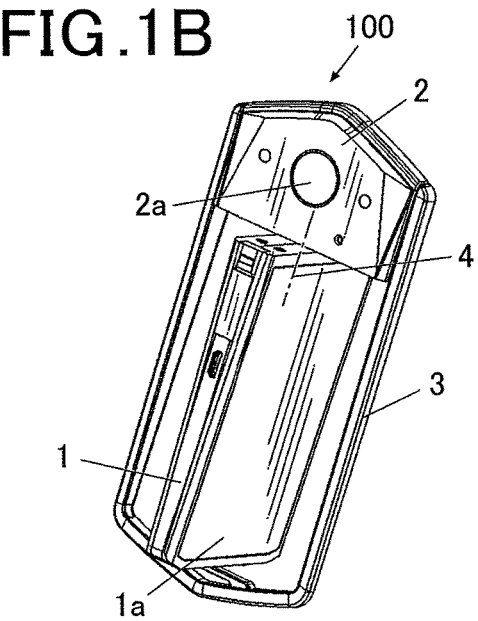
FIG. 1B is a perspective view of the camera, which is the first embodiment of the electronic device according to the present invention, illustrating the camera when a display unit is being rotated with respect to a lens unit.

FIG. 1A and FIG. 1B are perspective views of a camera 100, which is an embodiment of an electronic device according to a present invention. The components of the camera 100 can be roughly divided into a display unit 1, a lens unit 2 and a grip 3.

FIG. 1A is a perspective view of the camera 100 in a normal photography mode. That is, the camera 100 is in the state in which a display 1a of the display unit faces in an opposite direction to a lens (imaging section) 2a of the lens unit 2, and the grip 3 surrounds the display unit 1 and the lens unit 2.

FIG. 1B is a perspective view of the camera 100 when the display unit 1 is being rotated with respect to the lens unit 2.

As illustrated in FIG. 1B, the camera 100 is configured such that the display unit 1 with the display 1a is coupled to the lens unit 2 with the lens 2a via a first hinge shaft 4 in a mutually rotatable manner. Accordingly, a user can change a mode of the camera 100 from the normal photography mode to a selfie mode by rotating the display unit 1 so that the display 1a of the display unit 1 faces in the same direction as the lens 2a of the lens unit 2.

Next, an internal structure of the display unit 1 will be described.

Figure 2:
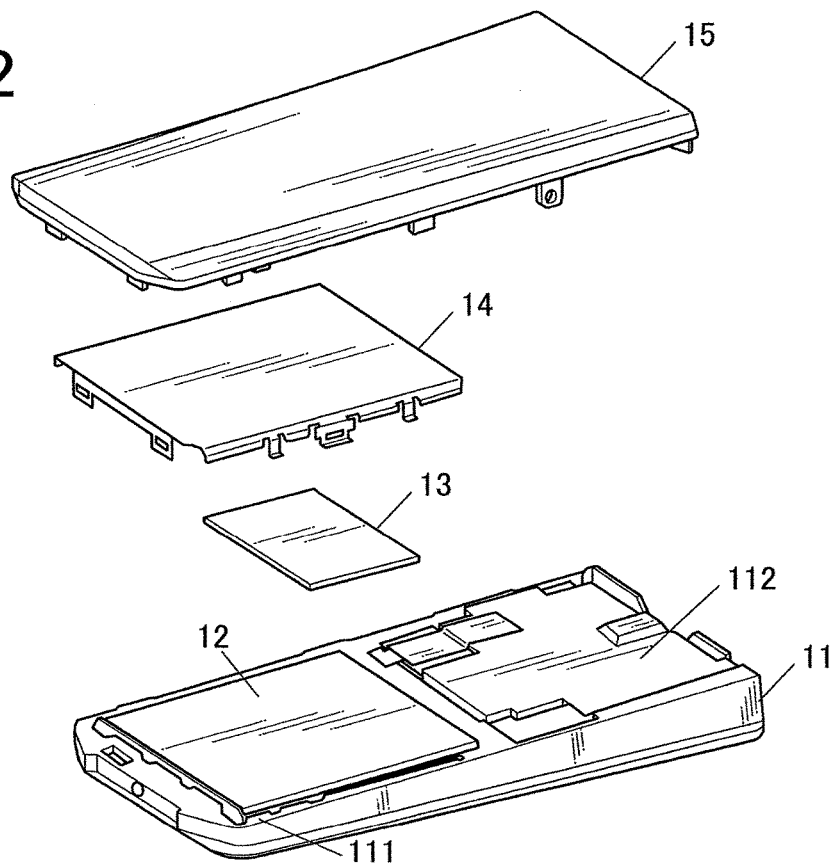
FIG. 2 is an exploded perspective view of the display unit.

FIG. 2 is an exploded perspective view of the display unit 1.

As illustrated in FIG. 2, the display unit 1 includes a case 11 in which the display 1a is placed, a battery assembly (battery unit) 12, a cushion 13, a cover frame 14 and an exterior case 15.

The case 11 includes a housing 111 in which the battery assembly 12 is housed. Further, the housing includes a driver circuit board 112 that drives the display 1a and the like.

The battery assembly 12 serves as a power source for driving the display 1a and the like. The details of the battery assembly 12 will be described later.

The cushion 13 is made of a cushioning material (e.g. an urethane foam sheet), which fixes the battery assembly 12 and protects a top surface thereof.

The cover frame 14 is provided to fix the battery assembly 12 housed in the housing 111. The cover frame 14 is attached in a predetermined position in the case 11 so as to cover the top surface of the battery assembly 12 via the cushion 13.

The exterior case 15 is provided to cover and enclose the battery assembly 12 housed in the housing 111 of the case 11 and the driver circuit board 112.

Next, the battery assembly 12 will be described.

Figure 3A:
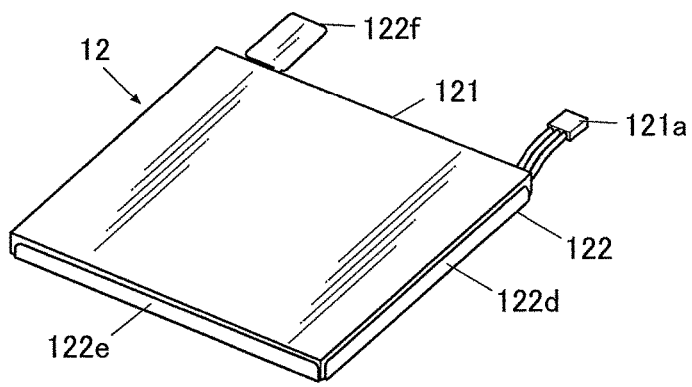
FIG. 3A is a perspective view of a battery assembly from above, which is placed with a top surface up.
Figure 3B:
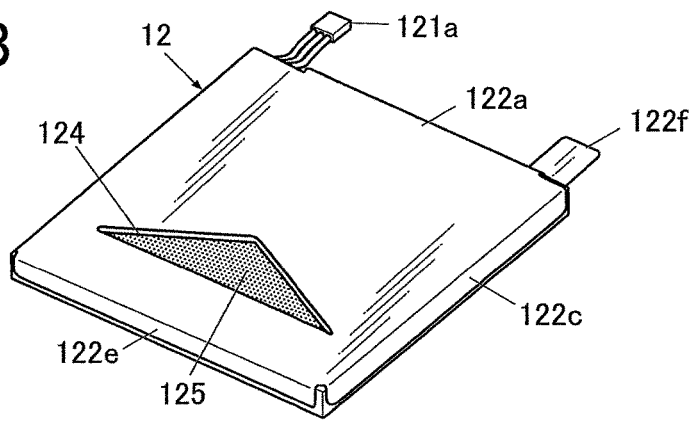
FIG. 3B is a perspective view of the battery assembly from above, which is placed with a bottom surface up.
Figure 4:
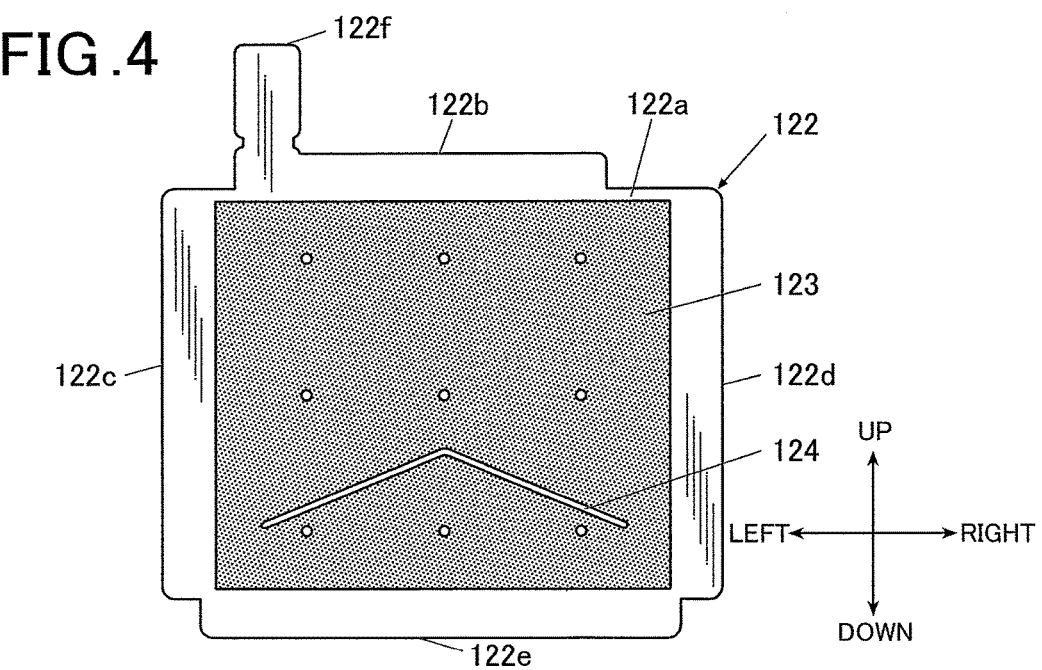
FIG. 4 illustrates an expanded view of a protection sheet.
Figure 5A:
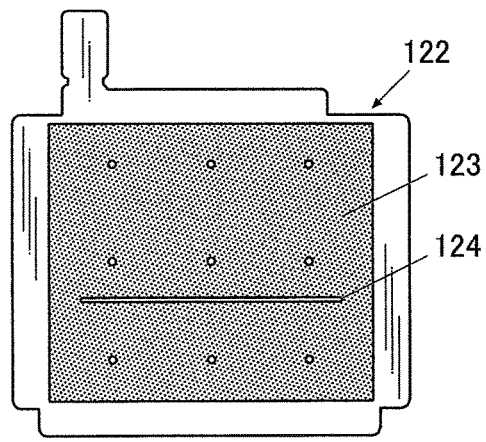
FIG. 5A illustrates another example of the protection sheet.
Figure 5B:
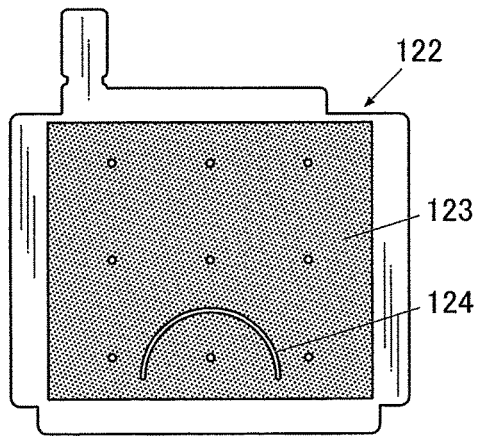
FIG. 5B illustrates still another example of the protection sheet.
Figure 5C:
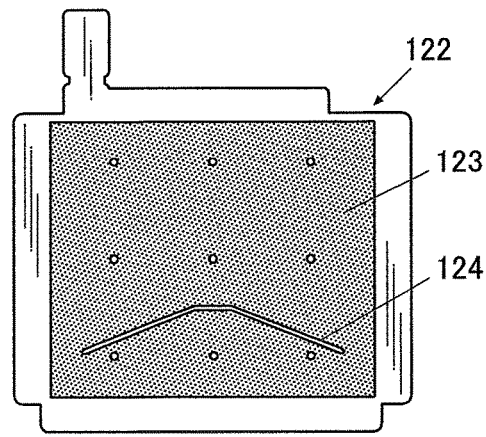
FIG. 5C illustrates still another example of the protection sheet.
Figure 5D:
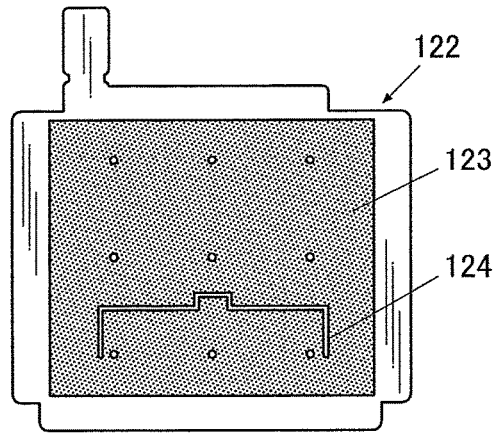
FIG. 5D illustrates still another example of the protection sheet.

FIG. 3A is a perspective view of the battery assembly 12 from above, which is placed with the top surface up, and FIG. 3B is a perspective view of the battery assembly 12 from above, which is placed with a bottom surface up. FIG. 4 illustrates an expanded view of a protection sheet 122.

As illustrated in FIG. 3A and FIG. 3B, the battery assembly 12 includes a battery 121 and a protection sheet (wrapping) 122.

The battery 121, which is a so-called soft pack battery such as a lithium-ion polymer battery, is formed in a rectangular flat plate shape. The battery 121 includes a connector 121a for electrical connection to the driver circuit board 112. When the connector 121a is connected to the driver circuit board 112, the battery 121 can supply electric power to the driver circuit board 112.

The protection sheet 122 is constituted by a wrapping material (e.g. PET film) for protecting the battery 121. The bottom surface and side surfaces of the battery 121 are wrapped with the protection sheet 122. By pulling up a picking portion 122f (described later) of the protection sheet 122, the battery 121 together with the protection sheet 122, i.e. the battery assembly 12, can be detached from the housing 111. The protection sheet 122 is disposable and is replaced with a new protection sheet 122 when the battery 121 is reused. However, the protection sheet 122 may be tearable for the replacement.

As illustrated in FIG. 4, the protection sheet 122 is composed of:

a bottom portion 122a with substantially the same dimension with the bottom surface of the battery 121;

an upper side portion 122b, a left side portion 122c, a right side portion 122d and a lower side portion 122e that are foldable wings continuously adjacent to the respective sides of the bottom portion 122a; and the picking portion (tab) 122f that is continuously adjacent to the upper left end of the upper side portion 122b.

The four side portions have substantially the same dimension as the respective side surfaces of the battery 121. However, the upper side portion 122b has a cutout at the right side. The right-side cutout is provided to form a gap for placing the connector 121a of the battery 121.

A slightly adhesive sheet 123 is pasted on the surface of the bottom portion 122a of the protection sheet 122 on the side facing the battery 121. The protection sheet 122 and the pasted slightly adhesive sheet 123 have a slit 124 in the bottom portion 122a.

The slit 124 has an inverted V shape that projects toward the center of the bottom surface of the battery 121 and does not reach the ends of the bottom portion 122a. That is, the slit 124 is formed near the opposite side (lower side of the bottom portion 122a) of the battery assembly 12 from the side (upper side of the bottom portion 122a) from which the battery assembly 12 is lifted by pulling up the picking portion 122f. Further, the picking portion 122f of the protection sheet 122 is provided at the side (upper side of the bottom portion 122a) from which the battery assembly 12 is lifted. That is, the picking portion 122f is continuously adjacent to the upper side portion 122b toward which the slit 124 projects (to which the vertex of the inverted V-shape is directed).

The slit 124 is not limited to the inverted V-shape. For example, it may be formed in a linear shape, an inverted U-shape, a trapezoidal shape, a linear shape with a protrusion or the like as illustrated in FIG. 5A to FIG. 5D.

As illustrated in FIG. 3B, a double-sided tape 125 is pasted to the protection sheet 122 in a part of the bottom portion 122a on the side (outer side) not in contact with the battery 121. Specifically, the double-sided tape 125 is pasted in an area (an triangular area in FIG. 3B) that is adjacent to the projected portion of the slit 124 and is located on the opposite side of the slit 124 from the center of the bottom surface of the battery 121. Accordingly, the housing 111 is bonded to the protection sheet 122 in the triangular area illustrated in FIG. 3B when the battery assembly 12 is housed in the housing 111 of the case 11 (see FIG. 6B). That is, the slit 124 may be formed in straight shape as long as the double-sided tape 125 is pasted in the area opposed to the center of the bottom surface of the battery 121 across the slit 124. While the area of the double-sided tape 125 meets the above-described conditions, it is preferred that the width of the double-sided tape 125 is as long as possible.

The adhesive strength of the double-sided tape 125 is greater than the adhesive strength of the above-described slightly adhesive sheet 123. That is, the adhesion of the surface of the slightly adhesive sheet 123 in contact with the bottom surface of the battery 121 is less than the adhesion between the housing 111 and the protection sheet 122.

Next, a detachable structure of the battery 121 will be described.

Figure 6A:
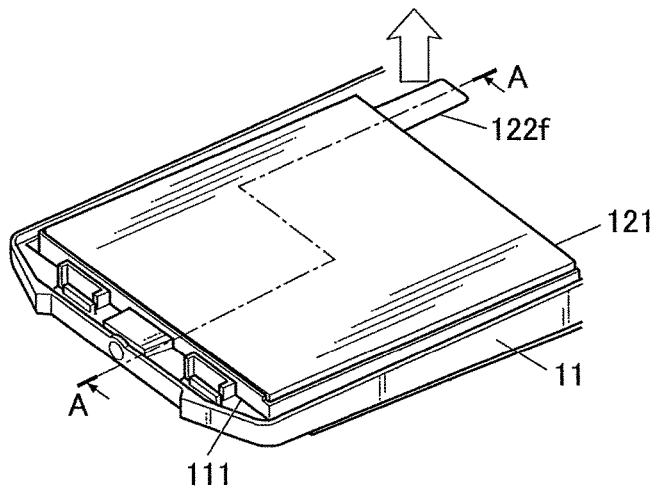
FIG. 6A is a partial enlargement view of the battery assembly housed in a housing of a case from above.
Figure 6B:
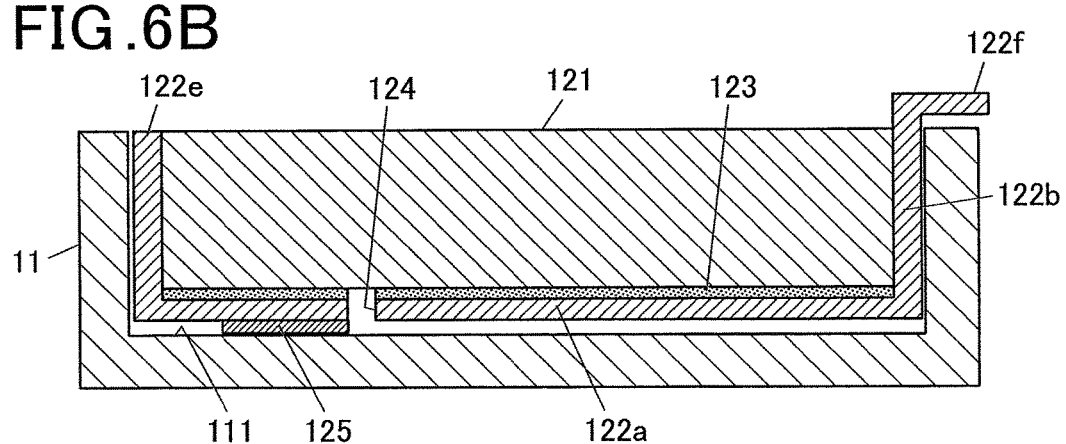
FIG. 6B is a cross sectional view of the battery assembly housed in the housing of the case from a direction of an arrows A in FIG. 6A.
Figure 6C:
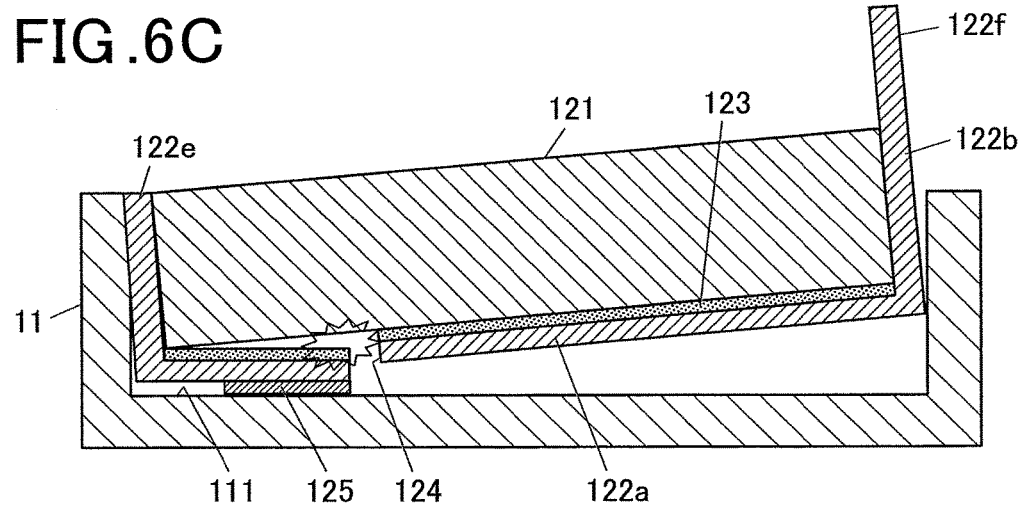
FIG. 6C is a cross sectional view of the pulled-up battery assembly from the direction of the arrows A in FIG. 6A.

FIG. 6A is a partial enlargement view of the battery assembly 12 housed in the housing 111 of the case 11 from above. FIG. 6B is a cross sectional view of the battery assembly 12 housed in the housing 111 from a direction of an arrows A in FIG. 6A. FIG. 6C is a cross sectional view of the pulled-up battery assembly 12 from the direction of the arrows A in FIG. 6A.

To attach the battery 121 to the housing 111, the bottom and side surfaces of the battery 121 are wrapped with the protection sheet 122 as illustrated in FIG. 3A and FIG. 3B, i.e. the battery assembly 12 is prepared. Then, by fitting the battery assembly 12 into the housing 111, the battery assembly 12 is housed in the housing 111 as illustrated in FIG. 6A and FIG. 6B, and the battery 121 is thus attached. In this step, the battery assembly 12 is bonded to the housing 111 by the double-sided tape 125. The housing 111 and the battery assembly 12 are designed such that the top surface of the battery 121 becomes substantially equal height with the top surface of a side wall of the housing 111 when the battery assembly 12 is housed in the housing 111.

To detach the battery 121 from the housing 111, the picking portion 122f of the protection sheet 122 is pulled upward as illustrated in FIG. 6A and FIG. 6C. Then, separation of the battery 121 from the protection sheet 122 starts from a vertex of the inverted V-shaped slit 124 of the protection sheet 122 as illustrated in FIG. 6C. This enables pulling up the battery assembly 12 without causing a bending stress in the battery 121. After the battery assembly 12 is pulled up, the battery 121 is removed from the protection sheet 122 so that the battery 121 is detached from the housing 111. Since the battery 121 is bonded to the protection sheet 122 by the slightly adhesive sheet 123, the battery 121 can be removed from the protection sheet 122 without causing the bending stress. Accordingly, the battery 121 can be readily detached without causing damage to the battery 121.

As described above, in the camera 100 of the embodiment, the battery 121 is wrapped in the protection sheet 122 having the slit 124, the case 11 includes the housing 111 in which the battery 121 wrapped in the protection sheet 122 is housed, and the housing 111 of the case 11 is bonded to the protection sheet 122 in a part of area.

In the camera 100 of the embodiment, when the battery 121 is detached from the housing 111, the battery assembly 12 can be pulled up without causing the bending stress in the battery 121. Therefore, the battery 121 can be readily removed from the protection sheet 122 after the battery assembly 12 is pulled up.

In the camera 100 of the embodiment, the battery 121 is wrapped in the protection sheet 122 with the slit 124 formed in a shape (inversed V-shape) that projects in the direction from an end to the center of the battery 121 and does not reach the ends of the battery 121. When the battery 121 is removed from the housing 111, separation of the battery 121 from the protection sheet 122 starts from the vertex of the inverted V-shaped slit 124 of the protection sheet 122. This enables pulling up the battery assembly 12 without causing the bending stress in the battery 121. Therefore, the battery 121 can be readily removed from the protection sheet 122 after the battery assembly 12 is pulled up.

In the camera 100 of the embodiment, the housing 111 of the case 11 is bonded to the protection sheet 122 in the area that is adjacent to the projected portion of the slit 124 and is located on the opposite side of the slit 124 from the center of the bottom surface of the battery 121. When the battery 121 is detached from the housing 111, this enables pulling up the battery assembly 12 without causing the bending stress in the battery 121.

In the camera 100 of the embodiment, the slit 124 is provided near a short or long side of the battery 121, which is opposite to the side from which the battery 121 wrapped in the protection sheet 122 is lifted. This configuration enables reducing a size of a bonded area between the housing 111 and the protection sheet 122 as small as possible and thereby preventing the battery 121 from being subjected to the bending stress when the battery assembly 12 is pulled up.

In the camera 100 of the embodiment, the protection sheet 122 includes the picking portion 122f on the side from which the battery 121 wrapped in the protection sheet 122 is lifted. This configuration can facilitate lifting the battery assembly 12.

In the camera 100 of the embodiment, the surface of the protection sheet 122 in contact with the battery 121 is adhesive at least in an area in contact with the bottom surface of the battery 121, and the adhesion of the area is weaker than the adhesion between the housing 111 of the case 11 and the protection sheet 122, and the battery 121 is bonded to the protection sheet 122 by means of the adhesion that is weaker than the adhesion between the housing 111 and the protection sheet 122. This configuration enables peeling the battery 121 from the protection sheet 122 without causing the bending stress.

In the camera 100 of the embodiment, the protection sheet 122 includes the rectangular bottom portion 122a and the side portions (the upper side portion 122b, the left side portion 122c, the right side portion 122d and the lower side portion 122e) that are foldable along the respective sides of the bottom portion 122a, and the bottom surface and the side surfaces of the battery 121 are wrapped respectively with the bottom portion 122a and the side portions of the protection sheet 122. This configuration enables suitably protecting the bottom and side surfaces of the battery 121.

In the camera 100 of the embodiment, the side portion (upper side portion 122b) toward which the slit 124 projects includes the picking portion 122f. By pulling the picking portion 122f upward, separation of the battery 121 from the protection sheet 122 starts from the vertex of the inverted V-shaped slit 124 of the protection sheet 122. This configuration enables pulling up the battery assembly 12 without causing the bending stress in the battery 121.

In the camera 100 of the embodiment, a gap is formed in the upper side portion 122b of the protection sheet 122 to place the wiring (connector 121a) that electrically connects the case 11 (driver circuit board 112) to the battery 121. This configuration enables suitably connecting the battery 121 to the driver circuit board 112 even when the battery 121 is wrapped in the protection sheet 122.

In the camera 100 of the embodiment, the top surface of the battery 121 becomes substantially equal height with the top surface of the housing 111 when the battery 121 wrapped in the protection sheet 122 is housed in the housing 111 of the case 11. This can suitably prevent a collision of the cover frame 14 and the exterior case 15 with the battery 121 when the cover frame 14 and the exterior case 15 are attached.

In the camera 100 of the embodiment, the above-described detachable structure can suitably reduce bending stress even when the battery 121 is the soft pack battery and therefore prevent the damage on the battery 121 that is caused during the removal thereof.

Variation

Next, a variation of the first embodiment will be described. The same reference signs are denoted to the same components as those of the first embodiment, and the description thereof is omitted.

A protection sheet 222 of a camera 200 according to the variation is different from the protection sheet 122 of the first embodiment in that the protection sheet 222 protects the top surface of the battery 121 as well as the side and bottom surfaces and is made of the same material as the slightly adhesive sheet 123 of the first embodiment.

Figure 8A:
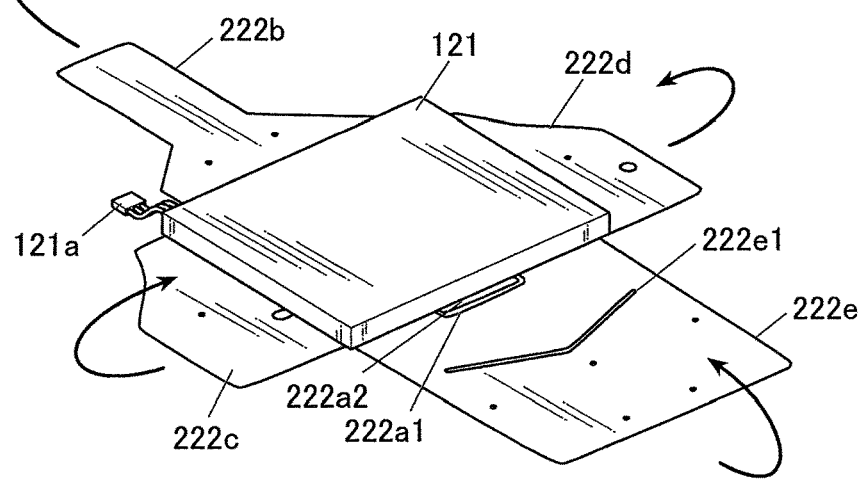
FIG. 8A illustrates a procedure to wrap a battery with the protection sheet according to the variation.
Figure 8B:
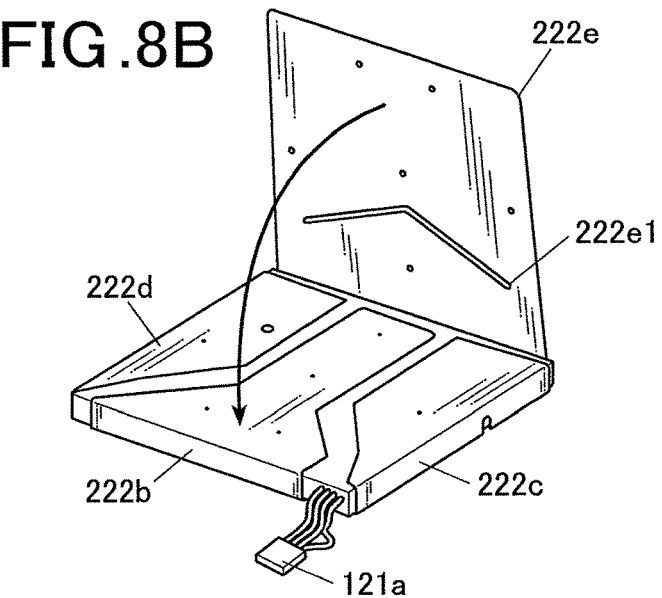
FIG. 8B illustrates the procedure to wrap the battery with the protection sheet according to the variation.
Figure 8C:
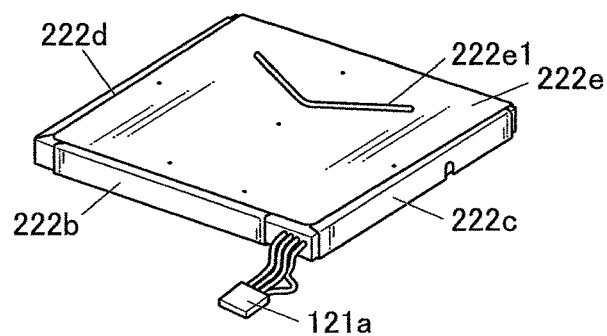
FIG. 8C illustrates the procedure to wrap the battery with the protection sheet according to the variation.

FIG. 7 illustrates an expanded view of the protection sheet 222 according to the variation. FIG. 8A to FIG. 8C illustrate a procedure to pack the battery 121 with the protection sheet 222. FIG. 9A is a perspective view of a battery assembly 22 before a picking portion 222a2 is pulled up, and FIG. 9B is a perspective view of the battery assembly 22 after the picking portion 222a2 is pulled up.

As illustrated in FIG. 7, the protection sheet 222 of the variation is composed of a top protecting portion 222a for protecting the top surface of the battery 121, and an upper foldable portion 222b, a left foldable portion 222c, a right foldable portion 222d and a lower foldable portion 222e that are continuously adjacent to the respective sides of the top protecting portion 222a.

In the top protecting portion 222a, a substantially angular U-shaped slit 222a1 is formed. The slit 222a1 forms a tongue-shaped picking portion 222a2 in the inner side of the top protecting portion 222a. The slit 222a1 is formed such that one end thereof (an end near the upper foldable portion 222b) does not reach an end of the top protecting portion 222a. This configuration is intended to prevent the picking portion 222a2 formed by the slit 222a1 from spontaneously lifting.

An other end (an end near the lower foldable portion 222e) of the slit 222a1 extends to reach the end of the top protecting portion 222a, i.e. to the boundary with the lower foldable portion 222e. This configuration of the slit 222a1 is intended to form the free end of the picking portion 222a2 at an edge of the battery 121 as illustrated in FIG. 9A and FIG. 9B so as to facilitate peeling the picking portion 222a2.

The upper foldable portion 222b is configured such that the proximal end is not symmetrical in a width direction, i.e. an left end is shorter than an right end. This configuration of the upper foldable portion 222b is intended to form a gap for placing the connector 121a of the battery 121 (see FIG. 8A to FIG. 8C).

In the lower foldable portion 222e, a slit 222e1 is formed, which corresponds to the inverted V-shaped slit 124 of the protection sheet 122 according to the first embodiment. The configuration of the slit 222a1 such as the shape and the position thereof is the same as that of the slit 124, and the description thereof is omitted.

Next, the procedure to pack the battery 121 with the protection sheet 222 will be described.

As illustrated in FIG. 8A, the battery 121 is pasted on the protection sheet 222 such that the top surface (a front face) of the battery 121 faces the top protecting portion 222a of the protection sheet 222. Then, as illustrated in FIG. 8A and FIG. 8B, the upper foldable portion 222b, the left foldable portion 222c and the right foldable portion 222d are folded and pasted on the bottom surface (a back face) of the battery 121. Finally, as illustrated in FIG. 8B and FIG. 8C, the lower foldable portion 222e is folded and pasted on the bottom surface of the battery 121.

As described above, in the camera 200 of the variation, the protection sheet 222 can also cover the upper surface of the battery 121. This configuration enables protecting the battery 121 more suitably than in the first embodiment using the protection sheet 122. In the camera 200 of the variation, the picking portion 222a2 can be provided by forming the slit 222a1 in the protection sheet 222. This configuration enables eliminating a protrusion of the picking portion 222a2 and thereby reducing a size of the battery assembly 22.

In the first embodiment, the picking portion 122f is provided at the upper left end of the upper side portion 122b of the protection sheet 122. However, this configuration is merely an example. It is only required that the picking portion 122f is provided on the side toward which the slit 124 protrudes, i.e. in the upper side portion 122b. For example, the picking portion 122f may be provided on an upper right end or an upper center of the upper side portion 122b.

In the first embodiment, the slit 124 has a laterally symmetric inverted V shape. However, the slit 124 does not have to be laterally symmetric, and suitable changes can be made according to the shape of the battery 121 or the like. Further, also with regard to the cutout which is provided at the right end of the upper side portion 122b to place the connector 121a of the battery 121, suitable changes can be made according to the location of the connector 121a.

In the first embodiment, the double-sided tape 125 is pasted in the triangular area as illustrated in FIG. 3B, which is an example of the area that is adjacent to the protrusion of the slit 124 and is located on the opposite side of the slit 124 from the center of the bottom of the battery 121. However, the area of the double-sided tape 125 is not limited inside the triangular area and may further extends toward the lower side portion 122e in FIG. 3B.

Second Embodiment

Next, a second embodiment will be described. The same reference signs are denoted to the same components as those of the first embodiment, and the description thereof is omitted.

A protection sheet 322 of the second embodiment is different from that of the first embodiment in that it does not have a slit but the entire sheet is thin so as to be tearable in replacing the battery 121.

Figure 10A:
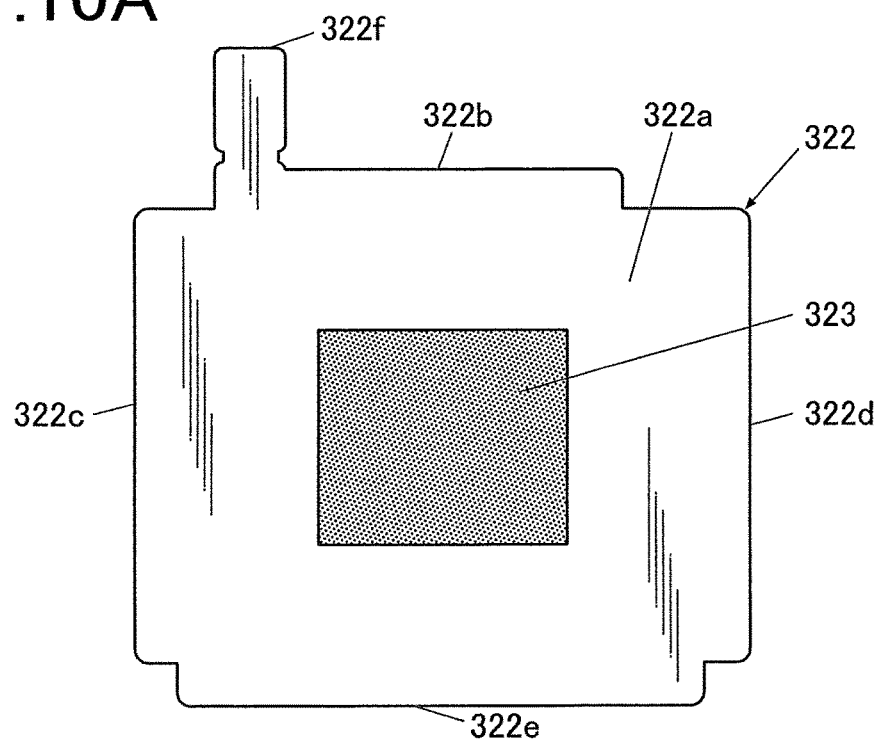
FIG. 10A is a plan view of a protection sheet according to a second embodiment.
Figure 10B:
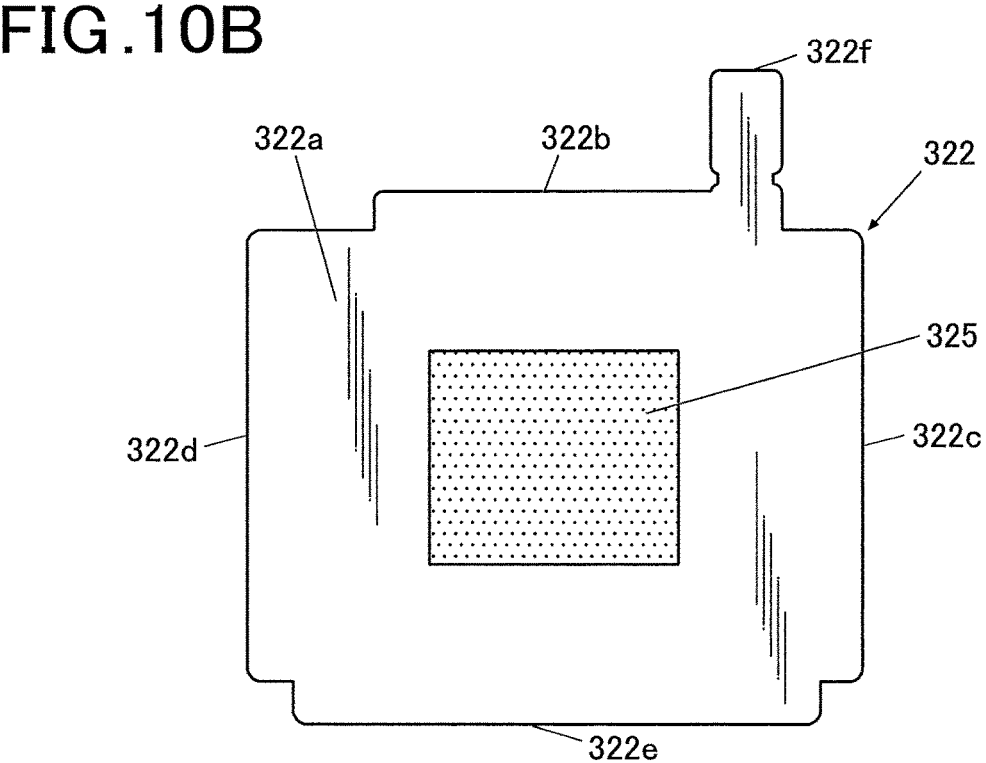
FIG. 10B is a bottom view of the protection sheet.

FIG. 10A is a plan view of the protection sheet 322 according to the second embodiment, and FIG. 10B is a bottom view of the protection sheet 322.

As with the protection sheet 122 of the first embodiment, the protection sheet 322 of the second embodiment includes:

a bottom portion 322a having substantially the same shape as the bottom of the battery 121;

an upper side portion 322b, a left side portion 322c, a right side portion 322d and a lower side portion 322e that are foldable wings continuously adjacent to the respective sides of the bottom portion 322a; and a picking portion (tab) 322f that is continuously adjacent to the upper left end of the upper side portion 322b as illustrated in FIG. 10A.

The four side portions have substantially the same dimension as the respective side surfaces of the battery 121. However, the upper side portion 322b has a cutout at the right side. The cutout is provided to form a gap for placing the connector 121a of the battery 121

As illustrated in FIG. 10A, a slightly adhesive sheet 323 is pasted on a surface of the bottom portion 322a of the protection sheet 322 on the side facing the battery 121. As illustrated in FIG. 10B, a double-sided tape 325 is pasted to a surface of the bottom portion 322a of the protection sheet 322 on the side (outer side) not facing the battery 121. The slightly adhesive sheet 323 and the double-sided tape 325 have a similar shape as the bottom portion 322a (rectangular shape), in which a similar ratio of the slightly adhesive sheet 323 and the bottom portion 322a and a similar ratio of the double-sided tape 325 and the bottom portion 322a are both 1:2. The slightly adhesive sheet 323 is pasted to the surface of the bottom portion 322a on the side facing the battery 121 such that a center of the slightly adhesive sheet 323 is coincide with a center of the bottom portion 322a. The double-sided tape 325 is pasted to the surface of the bottom portion 322a on the side not facing the battery 121 such that a center of the double-sided tape 325 is coincide with the center of the bottom portion 322a. That is, a center part of the bottom portion 322a is sandwiched between the slightly adhesive sheet 323 and the double-sided tape 325 to form a three-layer structure. A thickness of the center part of the bottom portion 322a is 0.13 mm (a thickness of the protection sheet 322 of 0.05 mm, a thickness of the slightly adhesive sheet 323 of 0.05 mm and a thickness of the double-sided tape 325 of 0.03 mm). The center part is thus designed to be tearable in replacing the battery 121.

The thickness of the center part of the bottom portion 322a is more preferably from 0.05 mm to 0.10 mm. This means that the total thickness of the center part of the bottom portion 322a is from 0.05 mm to 0.10 mm, and the respective thickness of the protection sheet 322, the slightly adhesive sheet 323 and the double-sided tape 325 may be changeable and suitably selected. Further, a slightly adhesive sheet that is made of the same material as the slight adhesive sheet 323 and is formed in the same shape as the protection sheet 322 may be used instead of the above-described protection sheet 322. This configuration allows the sheet to serve as both the slight adhesive sheet 323 and the double-sided tape 325. In this case, the thickness of the sheet (slightly adhesive sheet) is from 0.05 to 0.10 mm.

As described above, in the camera 300 of the embodiment, the battery 121 is wrapped with the protection sheet 322 that is formed in a predetermined thickness to be tearable in replacing the battery 121, the case 11 includes the housing 111 to which the battery 121 wrapped with the protection sheet 322 is housed, and the housing 111 of the case 11 is bonded to the protection sheet 322 in a part of area.

This configuration enables pulling up the battery assembly 12 without causing the bending stress in the battery 121 when the battery 121 is detached from the housing 111. Therefore, the battery 121 can be readily removed from the protection sheet 322 after the battery assembly 12 is pulled up.

Variation

Next, a variation of the second embodiment will be described. The same reference signs are denoted to the same components as those of the second embodiments, and the description thereof is omitted.

A protection sheet 322 of the variation is different from that of the second embodiment in that the sheet is partly thin so as to be tearable in replacing the battery 121.

Figure 11A:
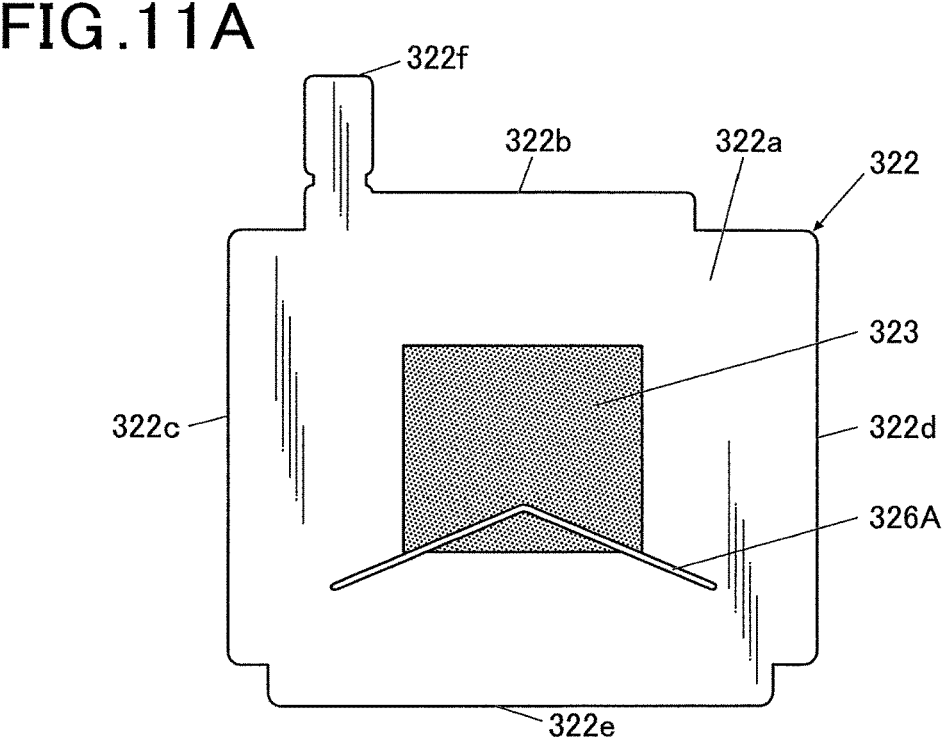
FIG. 11A is a plan view of a protection sheet according to a variation of the second embodiment.
Figure 11B:
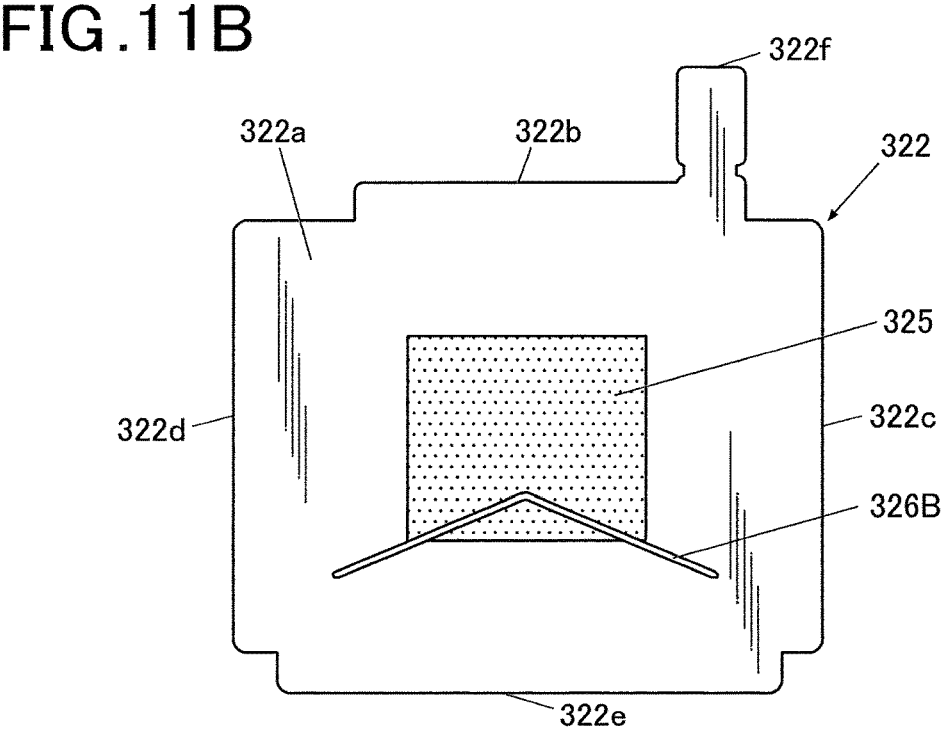
FIG. 11B is a bottom view of the protection sheet.

FIG. 11A is a plan view of the protection sheet 322 of the variation, and FIG. 11B is a bottom view of the protection sheet 322.

As with the protection sheet 322 of the second embodiment, a slightly adhesive sheet 323 is pasted to a bottom portion 322a of the protection sheet 322 of the variation on the side facing the battery 121 as illustrated in FIG. 11A. The protection sheet 322 together with the pasted slightly adhesive sheet 323 has a groove 326A in the bottom portion 322a. The groove 326A is formed in the same inverted V-shape at the same position as the inverted V-shaped slit 124 of the protection sheet 122 of the first embodiment.

As with the protection sheet 322, a double-sided tape 325 is pasted to the bottom portion 322a of the protection sheet 322 at the side (outer side) not facing the battery 121 as illustrated in FIG. 11B. The protection sheet 322 together with the pasted double-sided tape 325 has a groove 326B in the bottom portion 322a. The groove 326B is formed in the same inverted V-shape at the same position as the inverted V-shaped slit 124 of the protection sheet 122 of the first embodiment. That is, a part of the protection sheet 322 corresponding to the mutually opposed groove 326A and the groove 326B is thinner than the other part of the protection sheet 322. Also in the variation, a slightly adhesive sheet that is made of the same material as the slight adhesive sheet 323 and is formed in the same shape as the protection sheet 322 may be used instead of the above-described protection sheet 322 as in the second embodiment. This configuration allows the sheet to serve as both the slight adhesive sheet 323 and the double-sided tape 325. In this case, the groove 326A and the groove 326B are formed in the sheet.

Third Embodiment

Next, a third embodiment will be described. The same reference signs are denoted to the same components as those of the first and second embodiments, and the description thereof is omitted.

A camera 400 of the third embodiment is different from the first and second embodiments in that a battery assembly 42 is simply constituted by a rigid frame 422 and the battery 121 bonded thereon.

Figure 12A:
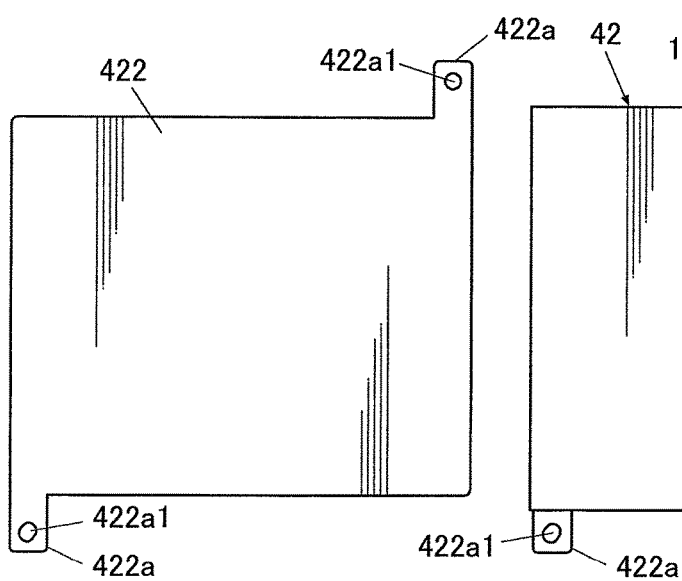
FIG. 12A is a plan view of a frame to which a battery is to be bonded, which is a third embodiment of an electronic device according to the present invention.
Figure 12B:
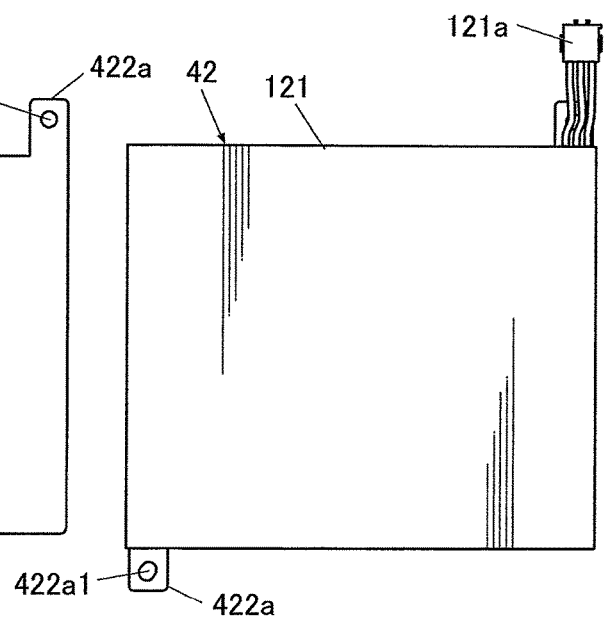
FIG. 12B is a plan view of the frame with the battery bonded thereto.

FIG. 12A is a plan view of the frame 422 to which the battery 121 is to be bonded, and FIG. 12B is a plan view of the frame 422 and the battery 121 bonded thereto.

As illustrated in FIG. 12A, the frame 422 is constituted by a rigid and magnetic member (e.g. martensite, ferrite or austenite-ferrite stainless steel) with a substantially rectangular plate shape. Due to a magnetic property, the frame 422 can stick to a magnet (not shown) provided in the housing 111 of the case 11. Further, the frame 422 includes a picking portion 422a that protrudes upward from an upper right end and a picking portion 422a that protrudes downward from a lower left end. In the picking portions 422a, respective holes 422a1 are formed, in which protrusions (not shown) formed at a predetermined position in the housing 111 of the case 11 are inserted. The frame 422 has a flat portion with approximately the same dimension as the bottom surface of the battery 121. The frame together with battery 121 bonded to the flat portion by a strong double-sided tape constitutes the battery assembly 42 as illustrated in FIG. 12B. The battery 121 is reusable together with the frame 422, i.e. as the battery assembly 42. Since the battery assembly 42 is fixed by the cushioning material 13, the frame 422 does not have to be magnetic.

Next, a detachable structure of the battery assembly 42 of the embodiment will be described.

FIG. 13A is a plan view of the housing 111 in which the battery assembly 42 is not housed. FIG. 13B is a plan view of the housing 111 in which the battery assembly 42 is housed (although the battery 121 is not shown in the figure). FIG. 13C is a plan view of the housing 111 in which the battery assembly 42 is housed.

To attach the battery assembly 42 to the housing 111, the battery assembly 42 is fitted into the housing 111 by fitting the picking portions 422a of the frame 422 to respective fitting portions (not shown) of the housing 111 and inserting the protrusions (not shown) of the housing 111 into the holes 422a1 of the respective picking portions 422a as illustrated in FIG. 13A and FIG. 13B. When the battery assembly 42 is thus housed in the housing 111, the battery assembly 42 is attached as illustrated in FIG. 13C.

To detach the battery assembly 42 from the housing 111, the picking portions 422a of the frame 422 is pulled up so that the battery assembly 42 can be detached from the housing 111 without causing the bending stress in the battery 121.

As described above, the camera 400 of the embodiment includes the frame 422 to which the battery 121 is bonded. The frame 422 is rigid and includes one or more picking portions 422a at least on a part of a side thereof. The case 11 includes the housing 111 in which the battery 121 bonded to the frame 422 is housed. The housing 111 includes the fitting portions (not shown) in which the picking portions 422a are fitted when the battery 121 bonded to the frame 422 is housed.

When the battery assembly 42 is detached from the housing 111 of the camera 400 of the embodiment, the above-described configuration enables readily detaching the battery assembly 42 from the housing 111 by pulling up the picking portions 422a of the frame 422 without causing the bending stress in the battery 121.

In the camera 400 of the embodiment, the housing 111 includes the protrusions (not shown) in the fitting portions, and the picking portions 422a have the respective holes 422a1 in which the protrusions are inserted. By means of the picking portions 422a and the holes 422a1 formed in the picking portions 422a, the battery assembly 42 can be positioned when the battery assembly 42 is housed in the housing 111. Furthermore, the battery assembly 42 can be fixed in a predetermined position.

In the camera 400 of the embodiment, the battery 121 housed in the housing 111 is further covered and enclosed in the exterior case 15 via the cushion 13. This configuration enables suitably fixing the battery assembly 42 to the housing 111 in the predetermined position.

In the camera 400 of the embodiment, the frame 422 is magnetic and is stuck to the magnet provided in the housing 111 of the case 11. This configuration enables suitably fixing the battery assembly 42 to the housing 111 in the predetermined position.

In the third embodiment, the battery assembly is positioned and fixed by means of the picking portions 422a that are provided respectively at the upper right end and the lower left end of the frame 422. However, this is merely an example. For example, when the battery assembly 42 can be positioned according to the outer shape of the battery 121, only a single picking portion 422a may be provided at either the upper right end or the lower left end of the frame 422.

In the third embodiment, the frame 422 is bonded to the battery 121 by the strong double-sided tape. However, this is merely an example. For example, the frame 422 may be bonded to the battery 121 by a slightly adhesive sheet. In this configuration, it is possible to reuse the battery 121 independently.

The present invention is not limited to the above-described embodiments, and a variety of improvements and design changes can be made without departing from the features of the present invention.

For example, the above-described embodiments and variation illustrate examples of cameras (cameras 100, 200, 300, 400). However, the present invention is not limited thereto, and the present invention is also applicable to other electronic devices such as smartphones equipped with the camera.

Although embodiments of the present invention have been described and illustrated in detail, it is clearly understood that the same is by way of illustration and example only and not limitation, the scope of the present invention should be interpreted by terms of following claims.

What is claimed is:

1. A detachable structure of a battery to be attached to a case, comprising:
a wrapping which wraps the battery and which comprises a slit; and
a housing of the case which houses the battery wrapped in the wrapping;
wherein the housing is bonded to the wrapping in a part of area.

2. The detachable structure of the battery to be attached to the case according to claim 1, wherein the slit of the wrapping projects from near an end of the battery toward a center of the battery.

3. The detachable structure of the battery to be attached to the case according to claim 2, wherein the part of area, where the housing is bonded to the wrapping, is adjacent to a projected portion of the slit and is located on an opposite side of the slit from the center of the battery.

4. The detachable structure of the battery to be attached to the case according to claim 1, wherein the slit is formed near a short or long side of the battery which is opposite to a side from which the battery wrapped in the wrapping is lifted.

5. The detachable structure of the battery to be attached to the case according to claim 1, wherein the wrapping comprises a picking portion at a side from which the battery wrapped in the wrapping is lifted.

6. The detachable structure of the battery to be attached to the case according to claim 1,
wherein a surface of the wrapping in contact with the battery is adhesive at least in an area in contact with a bottom surface of the battery, and
wherein adhesion of the area is weaker than adhesion between the housing of the case and the wrapping so that the battery is bonded to the wrapping by means of the adhesion which is weaker than the adhesion between the housing of the case and the wrapping.

7. The detachable structure of the battery to be attached to the case according to claim 6,
wherein the wrapping comprises a rectangular bottom portion and foldable wings which are foldable along respective sides of the bottom portion, and
wherein the bottom surface and side surfaces of the battery are wrapped respectively with the bottom portion and the foldable wings of the wrapping.

8. The detachable structure of the battery to be attached to the case according to claim 7, wherein the foldable wing toward which the slit projects comprises a picking portion.

9. The detachable structure of the battery to be attached to the case according to claim 7, wherein a gap for placing a wiring electrically connecting the case to the battery is formed in a part of the foldable wings.

10. The detachable structure of the battery to be attached to the case according to claim 1, wherein a top surface of the battery becomes substantially equal height with a top surface of the housing when the battery wrapped in the wrapping is housed in the housing of the case.

11. A detachable structure of a battery to be attached to a case, comprising:
a plate frame to which the battery is bonded; and
a housing of the case which houses the battery bonded to the frame,
wherein the frame is rigid and comprises a picking portion at least on a part of a side of the frame, and
wherein the housing comprises a fitting portion in which the picking portion is fitted when the battery bonded to the frame is housed.

12. The detachable structure of the battery to be attached to the case according to claim 11,
wherein the housing comprises a protrusion in the fitting portion, and
wherein a hole for inserting the protrusion is formed in the picking portion.

13. The detachable structure of the battery to be attached to the case according to claim 11, wherein the battery housed in the housing is covered and enclosed in an exterior case via a cushion.

14. The detachable structure of the battery to be attached to the case according to claim 11, wherein the frame is magnetic and sticks to a magnet provided in the housing of the case.

15. A detachable structure of a battery to be attached to a case, comprising:
a wrapping which wraps the battery and which has a predetermined thickness; and
a housing of the case which houses the battery wrapped in the wrapping,
wherein the housing is bonded to the wrapping in a part of area, and
wherein, when the battery is replaced, the wrapping is teared so that the battery is removed from the wrapping since the wrapping is bonded to the housing in the part of the area.

16. The detachable structure of the battery to be attached to the case according to claim 15, wherein a part of the wrapping is thinner than another part of the wrapping.

17. An electronic device, comprising the detachable structure of the battery to be attached to the case according to claim 1.

18. The electronic device according to claim 17, further comprising an imaging section.

* * * * *